United States Patent [19]

Naseck et al.

[11] 4,114,807
[45] Sep. 19, 1978

[54] CONTROL SYSTEM

[75] Inventors: Melvin L. Naseck, Peabody; Mark R. Hickman, Somerville, both of Mass.

[73] Assignee: Conservation Controls Corp., Boston, Mass.

[21] Appl. No.: 669,647

[22] Filed: Mar. 23, 1976

[51] Int. Cl.² ............................................. F24F 11/00
[52] U.S. Cl. ..................................... 236/1 E; 165/16; 307/39; 364/418
[58] Field of Search ............... 165/16, 22, 11; 307/39, 307/140, 62, 41; 236/1 E, 46 R, 49; 62/158; 219/485; 340/222, 258 R, 279; 364/418

[56] References Cited

U.S. PATENT DOCUMENTS

| | | | |
|---|---|---|---|
| 2,733,426 | 1/1956 | Jablonowski | 340/278 X |
| 2,975,411 | 3/1961 | Hanson | 340/347 |
| 3,011,718 | 12/1961 | Joerren et al. | 236/49 X |
| 3,110,010 | 11/1963 | Smith | 340/213 R |
| 3,115,622 | 12/1963 | Jaffe | 340/258 R |
| 3,489,913 | 1/1970 | Wildi | 307/41 |
| 3,797,560 | 3/1974 | Zaharoni | 165/26 |
| 3,875,955 | 4/1975 | Gallatin et al. | 137/487 X |
| 3,987,308 | 10/1976 | Burch | 307/41 |
| 4,000,400 | 12/1976 | Elder | 235/92 EV |

OTHER PUBLICATIONS

Control Systems for Heating Ventilating & Air Conditioning, Haines, 1971, p. 108.

*Primary Examiner*—William E. Wayner
*Attorney, Agent, or Firm*—Wolf, Greenfield & Sacks

[57] ABSTRACT

This system is of the power management type and is for controlling the operation of the various stages within a number of units such as heating, ventilation, and air conditioning units commonly referred to as HVAC units which may be of conventional design and for use in commercial buildings.

The system permits only a limited number of stages, fewer than the total number contained in all the HVAC units to be predeterminedly operated at one time but preferably stores an indication of all stages which are demanding operation of the total number of HVAC units in the building. If a greater number of stages are demanding than the system has been pre-set to operate then an indication of the unsatisfied or inhibited unit or units is stored. If this condition persists for a predetermined period of time such as 5 minutes then the longest running stage, even though it is sill demanding, is dropped or stopped and the longest waiting inhibited stage is satisfied or started. A further aspect of the system is to provide a counter that keeps a cumulative count of the occupants in the building at any one time. This count in turn controls operation of the action of the ventilating fans as well as the damper operations to reduce the total volume of outside air introduced to the building when the count decreases or is at a minimum and to increase the total volume of outside air by opening the dampers and starting ventilating fans as required when the count increases. The system can be predeterminedly set for a minimum pre-established amount of ventilation air introduced to the building as well as correlating the numbers of people as to when it introduces additional air to the building.

15 Claims, 5 Drawing Figures

CONTROL SYSTEM

BACKGROUND OF THE INVENTION

The present invention pertains to a control system and more particularly, a power management control system which is preferably used for controlling the operation of heating, air-conditioning and ventilating units of the type normally used in a commercial building. In accordance with one feature of this invention the system is operated on a demand basis permitting only a predetermined number of stages to operate at any one time but permitting other demanding stages to operate in sequence on the basis of dropping the longest running stage and selecting in its place the longest waiting stage. In accordance with another aspect of this invention the system is preferably used for controlling the volume of outside air accepted by the units as a function of a continuously updated cumulative count of the occupants in the building at any one time.

The electric utility companies in many areas of the country, for commercial customers, base their rates on basically two factors. The rate is based primarily on the kilowatt hour usage of the customer and is also based upon peak demand which is resettable to zero either monthly or yearly depending on the policies of the power company of the customer. A further introduction recently of a fuel oil adjustment percentage factor adds substantially also to the overall costs. The demand charge can be substantial and may be assessed even though the customer operates at peak demand for only a very short period of time (possibly only 15 minutes) out of a total month or year of operation.

Accordingly, one object of the present invention is to provide a power management control system for controlling a plurality of stages such as heating, air-conditioning and ventilating units and maintaining the peak demand at an acceptable level by limiting the total number of stages that can operate at any one time.

One known system operates so that only a limited number of units are operating at one time. However, this known system is unsatisfactory in that it operates strictly on a time clock basis permitting certain units to operate only during a fixed time period. This sytem is unsatisfactory primarily because the units may not be operated over a sufficient period of time. For example, with this known system a unit may be turned on by its thermostat near the end of its pre-permitted time cycle and thus is almost immediately turned off at the end of its time cycle. This intermittent operation of the unit is not satisfactory and is not a mode in which the unit is meant to operate.

Accordingly, another object of the present invention is to provide a power management control system wherein any unit that is permitted to operate is operated either until it is satisfied or at least a sufficient predetermined time period.

Another object of the patent invention is to provide a power management control system wherein possibly other types of electrically operated units or machines that are permitted to operate are operated either until satisfied or at least until a sufficient predetermined time period has elapsed.

In commercial buildings and especially those which are open to the public a system cannot operate to simply recirculate air from within the building. There is a requirement that a predetermined volume of fresh air be introduced into the building via the heating, air-conditioning and ventilating unit usually 5 to 15 cubic feet of air per minute per person depending on the business conducted in the building. Usually each unit comprises a fan and an associated damper which may be operated to completely recycle the air in the building or introduce predetermined amounts of fresh air from outside. It is typical to design the system on the basis of a maximum possible occupancy, provide for the fresh air through the ventilating fan and set the dampers thereby. In some systems the dampers on all units are simply maintained at their minimum open setting at all times that the HVAC units are operating thereby continuously causing outside air to be brought into the unit. This is most wasteful in that if, for example, it is cold outside and the heating unit is operating then the constant introduction of the cooled outside air requires more energy to be expended in heating the inside of the building. This is especially wasteful when the occupancy in the building is low.

Accordingly, a further object of the present invention is to provide a power management control system that is sensitive to the cumulative total of occupants in a building. The system preferably controls the ventilating fans and dampers of each HVAC unit, starting the ventilating fans and opening or partially opening a limited number of these dampers as a function of the number of people in the building.

Still another object of the present invention is to provide a power management control system that is sensitive to an occupancy count in a building for controlling the operation of possibly other types of electrically operated units.

Still a further object of the present invention is to construct a system in accordance with the principals of this invention which is efficient in operation, relatively easy to maintain, and which provides for smooth operation of the units which the system controls.

SUMMARY OF THE INVENTION

In accordance with the invention a system is provided for controlling the operation of a plurality of units or devices such as the various stages of heating, and/or air-conditioning, and ventilating units. Each of these stages has means for initiating a demand signal and means for initiating operation of the stage. In a heating, air-conditioning and ventilating unit the demand signal of the heating and/or air conditioning stages are initiated by the closure of a temperature responsive contact responsive to each of the stages and if, for example, heat is demanded then the heating portion of the unit is operated. The system comprises means for storing an indication of each stage that is demanding including means coupling from each unit for receiving a demand signal. This means for storing may be a register having a location corresponding to each unit. There are also provided means for counting the number of stages that are demanding, means responsive to said means for storing for accepting a predetermined number of stages less than the plurality of units and operating the predetermined number of stages or fewer thereof, and means for storing an indication of the demanding stages that have not yet been operated or satisfied. A means is provided for sensing a loss of a demand signal from one of the operating stages for transferring a demanding stage not yet satisfied to the means for accepting. In its preferred form the longest running stage is dropped and the longest waiting stage is transferred to the means for accepting for initiating operation of that stage. The system also provides means responsive to said means for accepting for droppint a stage after a predetermined period of operation and initiating operation of another stage in its place. Thus, if during a predetermined period of time of say 5 minutes none of the operating stages become satisfied then the system operates to force one of the operating stages to be dropped. This stage is the stage that has been running the longest and is replaced by one of the inhibited stages that has been the longest waiting. The control in accordance with this invention also operates so that if there are no waiting stages then the operating stages are maintained operated until each is satisfied.

In accordance with another aspect of the present invention a system is provided for controlling the operation of preferably a plurality of devices or units on a demand basis. This system is for use preferably in a commercial building wherein the system comprises means for continuously registering a count of the cumulative number of persons in the building. The system also comprises a means responsive to this cumulative count for operating the device or devices in a particular manner. For example, in a heating, air-conditioning and ventilating system each unit tupically has a fan and a damper associated therewith. The system of this invention is an energy and a money saving system in that the system does not continuously maintain the dampers in an open or partially open position but rather controls the number of dampers that are opened as a function of the cumulative count in the building as well as the number of ventilating fans in use if heat or cooling is not called for. In the past it has been wasteful to use a maximum amount of ventilation when in fact there may be a very few occupants in the building.

In accordance with this invention there is also provided a power management control method for controlling the operation of a plurality of electrically operated devices. This method comprises the steps of storing an indication of each unit that is demanding, oeprating a predetermined number which is preferably less than the total number of possible demanding devices, sensing when a device has been satisfied and in turn permitting operation of the longest waiting demanding device, and dropping a device after a predetermined period of operation and permitting operation of another device in its place which other device will be the longest waiting demanding device.

In accordance with the invention there is also provided a power management concept in accordance with a method of counting people within a building. In accordance with this method the people are counted in an in-out fashion to provide a cumulative count of people in the building at all times. This count is then used to control certain devices in the building. In the preferred form the count controls the dampers of heating, air-conditioning and ventilating units as a function of this cumulative count. If the count increases the ventilation (the air drawn in from the outside) increases and similarly if the count decreases then the ventilation needed decreases.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 1A:
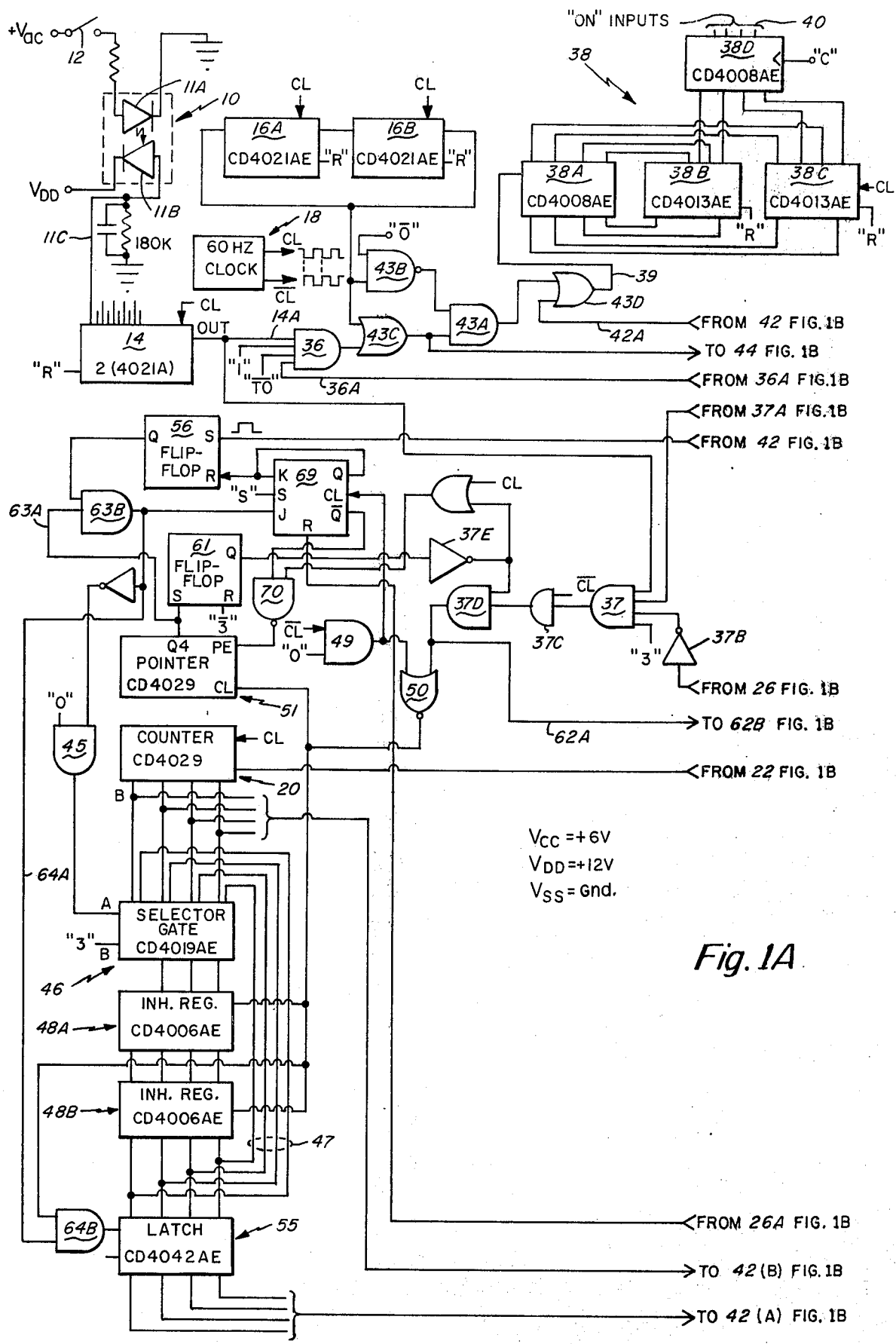
FIGS. 1A-1C shows a circuit schematic diagram of a control system in accordance with the present invention for controlling a heating, air-conditioning and ventilating system in accordance with the principles of this invention.
Figure 1B:
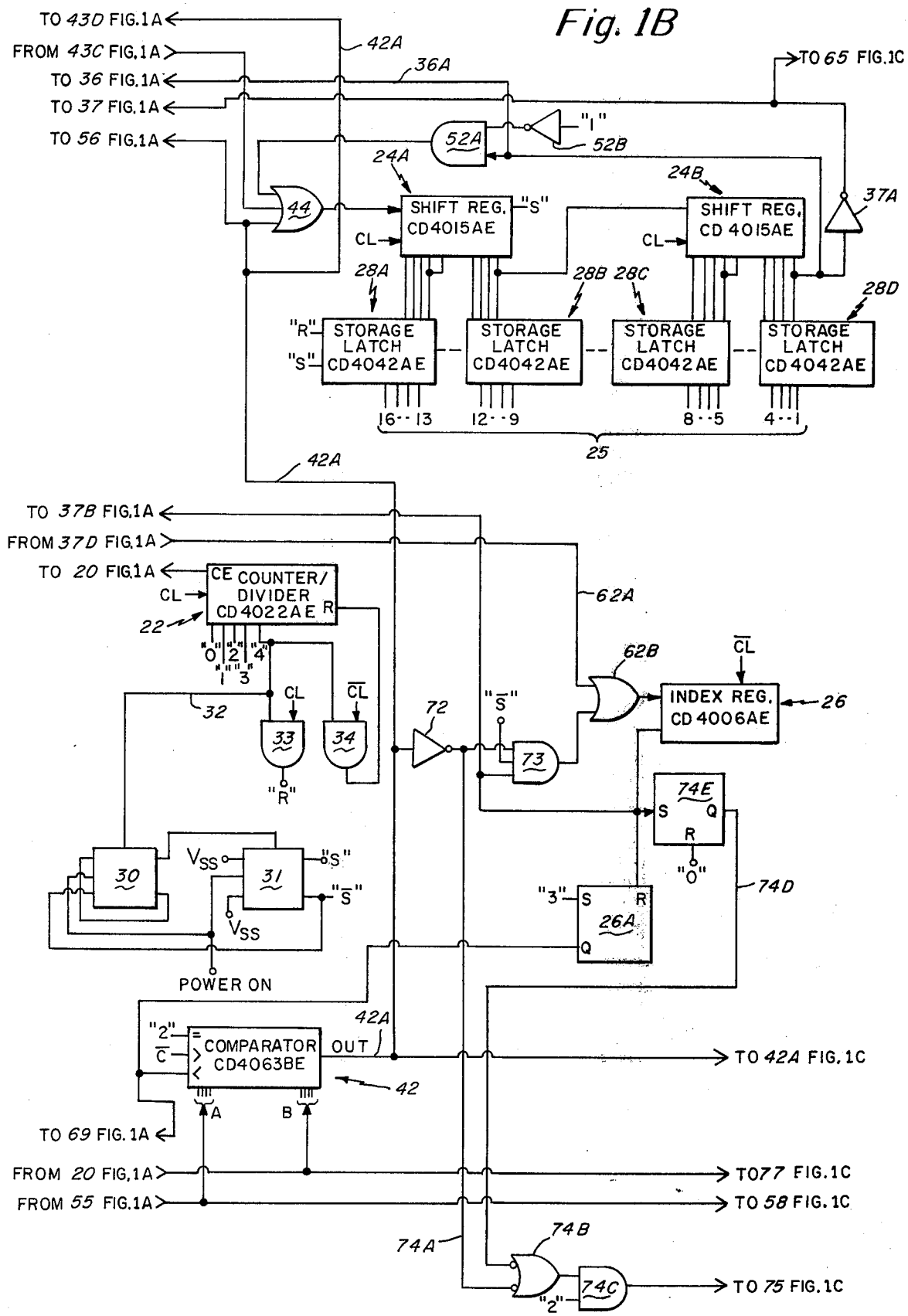
Figure 1C:
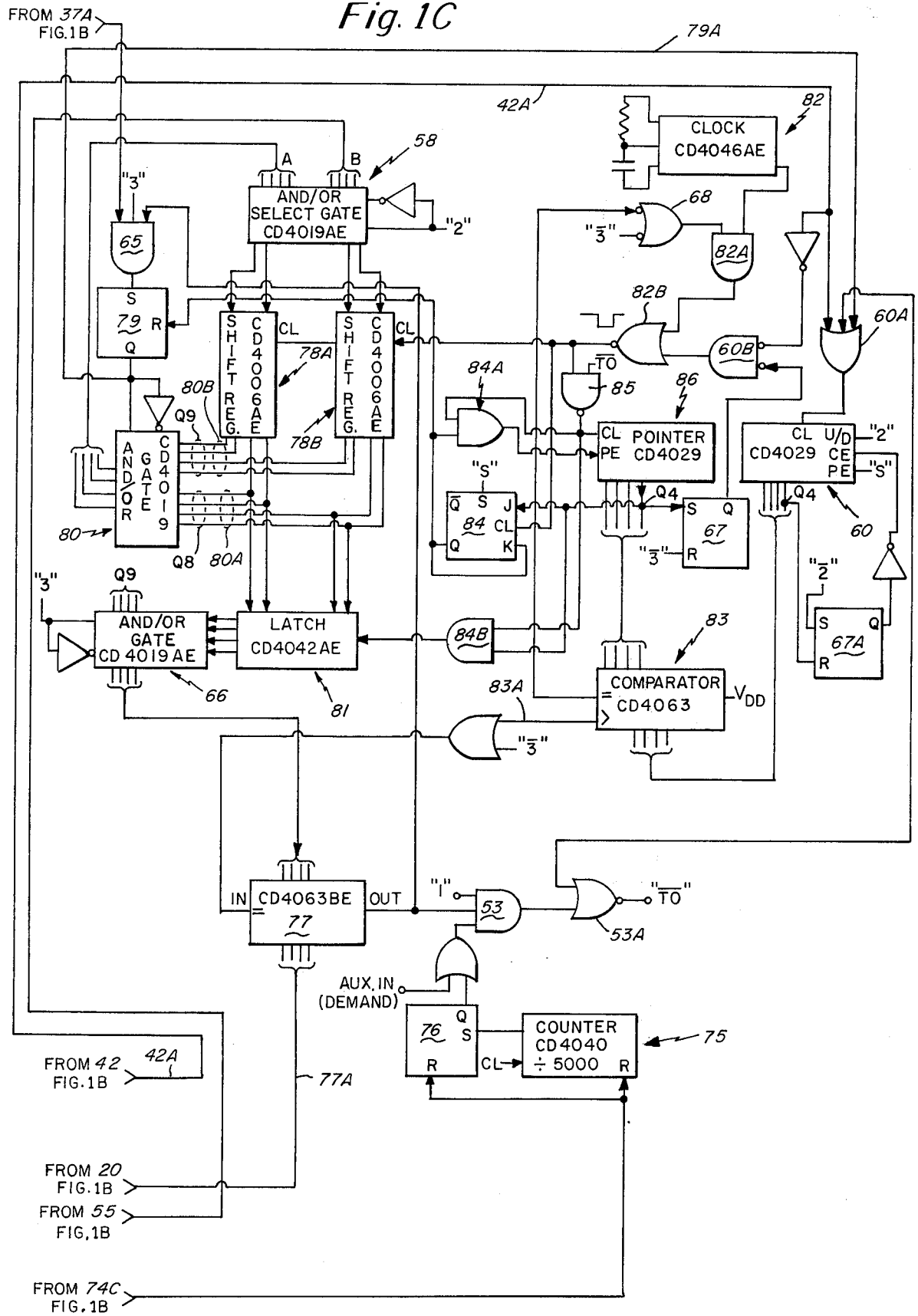

FIGS. 1A-1C show a complete schematic block diagram of a system of this invention. The system is disclosed as controlling sixteen units or, alternatively, eight double units. In either case the control is quite similar. In the disclosed embodiment the system is constructed using primarily all RCA integrated circuits. More particularly, COS/MOS integrated circuit chips are used.

In FIGS. 1A-1C there are many logic gates which comprises the control for the system that is shown. For the sake of simplicity it can be assumed that there are sixteen separate units to be controlled each of which has a demand circuit 10 associated therewith. The demand circuit 10 is responsive to a switch closure by switch 12 for storing a signal in register 14 which is a static shift register identified as shown. The static shift registers 16A and 16B may have hard wired inputs or may be connected in other ways and represent manditory ON conditions wherein one or more of the units may be always maintained in an activated condition wherein the manditory unit is operated each time it demands operation regardless of the state of other units.

The demanding status of the system is continuously monitored by clocking register 14 through its sixteen positions by means of a clock pulse (CL) from the main clock 18 which is a conventional divider and may be operated from the conventional 60 cycle, 110 volts a.c. line. These clock pulses continuously increment counter 20, also continuously increment counter/divider 22, clock the shift registers 24A and 24B, clock the index register 26, and are used throughout the circuitry shown in FIGS. 1A-1C for providing timing control of the entire circuit.

The outputs from the system are shown by the sixteen output lines identified by the bracket 25. These sixteen lines connect from storage latches 28A, 28B, 28C, and 28D. A "high" output from a latch represents an operating signal wherein the corresponding unit is running. The specific connections from the latches is not shown as it is a conventional interconnection possibly using a level converter for converting the logic level signals to higher voltage or power levels for operation of the unit.

The clock 18 provides the basic timing intervals and the counter/divider 22 provides for the demarcation of sequences which are identified in the drawings as sequences "0", "1", "2", and "3". During sequence "0" the mandatory ON inputs are scanned. These inputs are represented by bits of information stored in registers 16A and 16B. During sequence "1" a unit is maintained running if the demand from that unit is still being maintained. During sequence "2" under the proper predetermined conditions a new unit may be added. During the sequence "3" inhibited units which are demanding are stored. Each of the sequences lasts for a period of sixteen clock pulses. Thus, sequence "0" is at its enabling or high level for sixteen counts and then is inhibited after these counts with the sequence "1" then becoming enabled for the next sixteen counts, etc.

The system is initially conditioned by means of a circuit including D-type flip-flops 30 and 31. One of the inputs to both of these flip-flops is a power-on input which is a voltage level signal which occurs at the time that power is turned on in the system. When the power-on signal occurs the S output is high and the $\overline{S}$ is low. These levels are maintained for two cycles of the system thereby conditioning certain of the devices to an initial state. For example, it is noted that one of these set signals is coupled to all of the storage latches 28A–28D. After the counter/divider 22 has progressed through two cycles then the output line 32 representative of sequence "4" goes high and the set signals terminate. However, the reset signal "R" occurs each cycle of the counter 22. After the reset signal occurs via gate 33, a reset signal occurs by way of gate 34 to reset the counter/divider 22 to its "0" sequence. It is noted that the reset signal is used in the storage latches also and is used in other portions of the control circuitry.

The switch 12 may schematically represent a bimetallic contact of a thermostat associated with one of the units. When this contact 12 closes this is an indication that the associated unit should be operated to require, for example, the necessary heat to bring the temperature in that area up to a sufficient level so that the contact 12 is satisfied and thereby opens. The state of the switch 12 is sensed by a demand circuit 10 which comprises a light emitting diode 11A in combination with a photoresistor 11B. When the contact 12 is closed a logic "high" level is on line 11C. When the switch 12 is opened a logic "low" level is on the line 11C. When there are sixteen units there are of course sixteen input lines 11C that couple to the shift register 14. The clock pulses from clock 18 shift the shift register 14 in sequence with each unit being interrogated and its corresponding condition on line 14A. This clocking continues in a cycle, each of the units being interrogated in sequence. The output signal on line 14A couples to AND gate 36 and also to AND gate 37.

In accordance with the principles of this invention the system permits operation of only a predetermined number of units generally fewer than the possible maximum number of units. In the example herein sixteen units are capable of demanding and one may establish the system so that only a maximum of eight units can be operating at any one time. To accomplish this the system comprises a comparator circuit 38 which comprises an adder 38A dual flip-flop circuits 38B and 38C and adder 38D. This comparator circuit is of conventional design and it operates on a two's compliment comparison technique. It is noted that the flip-flops 38B and 38C have an R input which means that this comparator circuit is essentially reset after the completion of each sequence as defined by counter 22. The comparator circuit 38 is comparing an input count on line 39 with a set input on lines 40. The input to adder 38D may be a hard-wired input or it may be a programmed input as discussed in more detail hereinafter. If one desires to operate only eight units at a time then the corresponding binary code is hard-wired as an input on lines 40. In another arrangement the inputs on lines 40 may be programmed inputs coupled from another control system not shown herein.

The comparator circuit 38 in an alternate embodiment might comprise a counter for counting the input pulses on line 39, a register for displaying a fixed binary word corresponding to the inputs on lines 40, and a multi-input comparator for comparing the output of the counter with the output of the register.

In the disclosed embodiment the output from the comparator circuit 38 is taken from the adder 38D which is designated as an enabling output "C". This output is provided when the count on input line 39 exceeds the count represented by lines 40 thereby indicating that the maximum number of permissable units are operating and thus no further units are committed to operate. The negation of the "C" signal is used as an input to the comparator 42 which is discussed in more detail hereinafter.

The sequence of operation of the system is controlled primarily by the sequence counter 22. It is noted that the sequential outputs from this counter couple to many of the gates and other devices shown in the system. The operation of the system will now be explained in terms of this sequence of operation.

During sequence "0" gate 43A is enabled by way of gate 43B and if there are any mandatory outputs stored in registers 16A and 16B then the outputs are passed by way of OR gate 43C and AND gate 43A to gate 43D and from there via line 39 to the comparator circuit 38. Thus, each mandatory input clocks the comparator circuit 38 and on the other hand if there are no mandatory locations in the registers 16A and 16B then there is no counting of the comparator circuit 38 via line 39. It is also noted that the gate 36 is inhibited during the sequence "0" operation. However, any mandatory inputs that are to be introduced into the system are coupled through gate 43C to OR gate 44. The output of OR gate 44 couples to shift register 24A. Thus, if, for example, the first unit is to be a mandatory unit then a "high" level signal is coupled from the output of gate 44 in the number one position to indicate that the first unit is to be in a mandatory sequence of operation. During the reset time its indication is transferred to latch 28D which stores a high level or "1" in the first location. In this example if the first unit is not demanding it may not be operated because both conditions have to be satisfied; that is an enabling output must be received from the latches and secondly the corresponding switch must be in its closed (demanding) position.

The inputs to registers 16A and 16B may be hard-wired or may also be programmed. When dual units are controlled some inputs to the registers may be from latches 28A–28D so that one part of the unit is held in a mandatory state as long as the other part is demanding.

During sequence "0" AND gate 45 is also enabled thereby controlling selector gate unit 46 for recirculating the information by way of lines 47 from the inhibit registers 48A and 48B. During sequence "0" AND gate 49 is also enabled. Its output couples to NOR gate 50 whose output in turn couples to inhibit registers 48A and 48B and up-down counter or pointer 51. Pointer 51 counts and an output is reached at an eight count (line 63A high) but gate 63B is not satisfied as flip-flop 56 is reset. Thus, gate 45 is satisfied but only zeros are recirculated. Further operation in sequence "0" is discussed hereinafter in a subsequent cycle of operation.

During sequence "1" gate 36 is enabled. However, if it is assumed that there have been no mandatory calls the registers 24A and 24B contain all zeros and thus the input line 36A is at its low level thereby initially inhibiting gate 36. In sequence "1" both conditions must be met; that is a unit must have been running and must still be demanding. Thus, during the initial cycle of operation after initialization of the system during the first two sequences if there are no mandatory calls then there are no count pulses on line 39 to the comparator circuit 38 and at that point no units are running.

It is noted that during sequence "1" gate 42A is inhibited by way of gate 52B thereby inhibiting recirculation in the registers 24A and 24B. The AND gate 53 is also enabled during sequence "1" which will permit a time-out pulse with a certain set of conditions which will be discussed hereinafter. This time-out pulse is coupled to the gate 36. This timing-out is concerned with the operation in accordance with the invention wherein units have been operating over a predetermined period of time and it is desired to drop the longest running unit and substituted therefor the longest waiting unit.

After sequence "1" has been completed then the system enters sequence "2". In this sequence the four-bit comparator 42 is enabled provided that flip-flop 26A has been reset in a previous sequence. The other input to comparator 42 is also satisfied in that the "C" signal is high and its negation is thus at its low level. The four-bit comparison is between the output from counter 20 and the output from the latch 55. In a given cycle it can be assumed that the output from the latch is a binary "0" and when the counter 20 is also at binary "0" for that one count there is a positive pulse coupled on line 42A to gates 43D and 44, and also to the flip-flop 56 for setting this flip-flop. This count pulse on line 42A counts the comparator circuit 38 and also forces a "1" into the registers 24A and 24B in the first location thereby indicating that the first unit is in operation.

During sequence "2" the selector gate unit 58 is conditioned as discussed hereinafter and the up/down counter 60 is also conditioned for counting up.

After sequence "2" has been completed then the counter/divider 22 goes to sequence "3". At the commencement of this sequence the data in the shift registers 24A and 24B is a zero in all locations. During this sequence gate 37 is enabled and will have a "high" output as long as all the input conditions to the gate are satisfied. One input to gate 37 is by way of inverter 37A from the output of shift registers 24A and 24B. In all positions the output from the shift registers is a "0" and thus the gate 37 is enabled. Another input to gate 37 is from line 14A. The index register 26 contains all "zeros". The output from the index register 26 which is coupled by way of inverter 37B satisfies that input to the gate 37. Thus, the gate 37 is satisfied each time a high output occurs on line 14A. This signal is coupled by way of gate 37C and AND gate 37D to gate 50. The input to gate 37D from inverter 37E is also satisfied in that the flip-flop 61 is reset. Thus, for each demanding unit a clock pulse is sent from gate 50 to the pointer 51 and to the inhibit registers 48A and 48B thereby incrementing the pointer and successively storing binary codes in the inhibit registers representative of the demanding units that have not yet been satisfied.

It is noted that each time gate 37D is satisfied a "high" level signal is coupled on line 62A to OR gate 62B. This signal sets a "1" into the index register at the proper clocking time thereby indicating that there is a corresponding location stored in the index register which has demanded. It is noted during sequence "3" the selector gate unit 46 is enabled for receiving counts directly from the counter 20. The counter 20 counts on each clock (location) pulse but the pointer 51 and registers 48A and 48B count only when there is an unsatisfied demand.

If there are greater than eight inhibited units the pointer 51 has a high output on line 63A which sets flip-flop 61 and enables the input to gate 63B. With flip-flop 61 set gate 37D is now inhibited and there are no further counting pulses by way of gate 50 to the pointer 51 or the inhibit registers. Also, gate 63B is satisfied as flip-flop 56 is still set and thus a "high" level signal is coupled by way of line 64A to AND gate 64B. Thus, on the last clock pulse from gate 50 the location of the first inhibited register which may be location number one is stored in the latch 55.

Thus, during sequence "3" the system is conditioned to store the demanding units which are still inhibited in that these locations are not stored in the storage 28A-28D. Also, during sequence "3" gate 65 is enabled, selector gate unit 66 is conditioned, flip-flop 67 is reset and gate 68 is enabled unconditionally.

After the termination of sequence "3" counter 22 goes into sequence "4" and generates the reset signal R. The comparator circuit 38 is reset to a zero count and the data in the registers 24A and 24B is latched into the storage latches 28A-28D. The counter 22 then reverts to sequence "0" and again if one assumes that there are no mandatory calls then no counting occurs of the comparator circuit 38 during this sequence. Gate 45 is enabled and the information in the inhibit registers is recirculated by way of lines 47. The first pulse from gate 49 during this sequence has no effect on the bistable device 69 as gate 63B is not satisfied. Pointer 51 is reset to "0" by way of gate 70 after the eight count of pointer 51.

After the termination of sequence "0" the system then moves to sequence "1". The purpose of this sequence is to continue an output if there is still a demand. For example, in position "1" of the shift registers 24A and 24B if there is a binary 1 and if its location is also demanding by way of line 14A then gate 36 is satisfied and this data is counted by way of line 39 and also reintroduced into the shift registers by way of gate 44. If alternatively there is a "0" in the shift registers 24A and 24B and there is a demand in that location gate 36 is not satisfied.

During sequence "2" and assuming that a maximum number of running units has not yet been reached, four-bit magnitude comparator 42 is enabled provided that flip-flop 26A has been reset. If latch 55 contains a binary count of say "3" then when the counter 20 reached the same binary count an output occurs on line 42A. This signal increments the comparator circuit 38 and also adds an operating unit by way of gate 44 thereby introducing a "1" into the shift registers 24A and 24B at this location "3" corresponding to the third unit that is the next unit in line that has demanded.

It has been previously mentioned that each time the unit is stored in the inhibit registers that the index register carries a corresponding "1" in that location. Similarly, when at a location a signal is generated on line 42A this signal is coupled by way of inverter 72 and gate 73 to the index register for forcing a "0" into that location. Thus, when a particular unit is operating it is no longer inhibited and thus is no longer stored in the index register. The output of gate 72 inhibits the gate 73 during this location and thus forces a zero into the index register in that location.

Also, during this "2" sequence the low level signal from the output of inverter 72 is coupled by way of line 74A to gate 74B which has a high output enabling AND gate 74C. The output from gate 74C is high during interval "2" and thus a reset is provided to the 5-minute counter 75. As long as the counter 75 is reset during the 5-minute time interval there will be no time-out. When the counter 75 does not reset then at the end of the 5-minute time interval the flip-flop 76 is set, gate 53 is enabled and the time-out signal occurs. Gate 53B permits connection of an auxiliary demand control input for forcing a time-out under predetermined externally controlled conditions. This operation is discussed in more detail hereinafter.

The gate 74B may also be operated by way of line 74D from the flip-flop 74E. If there are no inhibited locations then all of the index register will be at a "0" and thus flip-flop 74E will not set under that condition. The output on line 74D is at its low level permitting a resetting of the counter 75. Thus, regardless of the condition on line 74A if there is no inhibited unit then it is not desired to time-out the counter 75.

During the subsequent sequence "3" the inhibit registers may be clocked and the unit 46 is conditioned to receive inputs from the counter 20. The gate 37 is satisfied during this interval if in any one location there is a demand by way of line 14A, the unit has not previously been running (output from gate 37A) and the index register contains a zero for that location indicating that that location has not previously been inhibited. If flip-flop 56 has been set because another unit has been added in the previous sequence gate 63B may be satisfied and the longest waiting location is entered into the latch 55.

After a few cycles of operation it is likely that pointer 51 will not count to eights in sequence "3". However, during the following sequence "0" gate 64B will be satisfied and the longest waiting location will be advanced to latch 55.

The cycles continue in this manner, a unit being added each cycle. If, for example, all units are demanding eventually, the comparator circuit 38 will indicate a full condition (predetermined or programmed number of units now operating) and there will be no further outputs on line 42A from the comparator 42. With no further pulses on line 42A the flip-flop 56 does not become set, gate 63B is not satisfied and no further locations are loaded into the latch 55.

If a condition persists wherein both lines 74A and 74D stay high then the counter 75 is not reset and the time-out signal occurs from gate 53A. The comparator 77 controls the time at which the time-out signal occurs so that the location that has been running the longest is the one that is dropped. This location is dropped by virtue of the gate 36 being inhibited during sequence "1" at this location. Thus at this location a "0" is forced into registers 24A or 24B in that location and unit operation ends.

In the event that a demand is satisfied on an operating unit that unit will be dropped. This condition is sensed by gate 36 which inhibits a count pulse by way of line 39. Thus, the comparator circuit 38 by way of comparator 42 indicates that a unit can be added during subsequent sequence "2".

As each inhibited location is stored in latch 55 and when the location is to be added during sequence "2" the output from latch 55 is transferred by way of the selector gate unit 58 to the shift registers 78A and 78B. This location is now the shortest running location (unit). During the other sequences the unit 58 and the selector unit 80 cause a recirculation of the data in the shift registers 78A and 78B. The outputs from the shift registers 78A and 78B couple in groups 80A and 80B to the unit 80. The group 80A represents the eighth position of the shift registers and the group 80B represents the ninth position of the shift registers. The group 80A also are coupled to the latch 81. This recirculation is dependent upon the state of flip-flop 79 as discussed in more detail hereinafter. The latch 81 holds the location which has been running the longest.

The system also is provided with a high-speed clock 82 which may have an output of 10 kilohertz. The output from this clock couples to AND gate 82A whose output in turn couples to NOR gate 82B. During sequence "3" by way of gate 68, gate 82A is unconditionally enabled. Gate 82A may also be enabled by way of gate 68 from the output of a comparator 83.

The up/down counter 60 maintains a running count of the units that are operating up to a total of say eight units. During sequence "2" the counter is conditioned to count up and is conditioned to count down during other sequences. Thus, each time that a signal is received on line 42A from comparator 42 the counter 60 counts up by way of gate 60A. This signal on line 42A also enables one input to gate 60B. If flip-flop 67 is reset, gate 60B has a high output and a clock pulse may be provided by way of gate 82B to the shift registers 78A and 78B, to the flip-flop 84 and also by way of NAND gate 85 to the pointer 86.

When we are operating during sequence "2" and units are still being added, these running units are entered into the shift registers 78A and 78B by way of the unit 58. The registers are clocked by way of line 42A and gates 60B and 82B. The pointer 86 is also clocked at the same time. Similarly, the counter 60 is counted up during this sequence. When the pointer 86 reaches its maximum count, say of eight, the flip-flop 67 is set and its output inhibits further clocking of the shift registers by way of inhibiting gate 60B. When counter 60 reaches a full eight count, flip-flop 67A is reset and via gate 67B the counter 60 is reset to zero. Counter 60 is not resettable during the other sequences.

During sequence "2" we have been concerned with adding previously inhibited units to the registers 78A and 78B. The gate 68 is enabled and in turn enables the gate 82A primarily in sequence "3" but gate 68 can also be enabled during any other sequence primarily during reset by way of line 68A from comparator 83 when the count in counter 60 is not equal to the count in pointer 86. When the two counts become equal further clocking of the pointer 86 terminates. The pointer 86 is normally clocked by way of the gate 85 from the output of gate 82B. The time-out signal from gate 53A enables gate 85 except when a time-out signal occurs.

During sequence "3", as previously mentioned, inhibited units are stored. Also, the state of the output registers 24A–24B is interrogated at the fast clock rate determined by clock 82. The primary purpose of this interrogation is to determine if a previously operating unit has been satisfied and should thus be dropped. This condition is primarily sensed at the output of gate 37A by AND gate 65.

When sequence "3" is entered the gate 68 is unconditionally enabled and the shift registers 78A and 78B are rapidly shifted. The clocking pulses for the shift registers couple from the output of gate 82B which receives an output in turn from gate 82A. These clock pulses are continuous during sequence "3". These clock pulses also feed by way of gate 85 to the clock input of pointer 86 and to gate 84B. The output from gate 82B also couples to flip-flop 84. These clock pulses that are delivered to flip-flop 84 do not have any effect until its "J" input goes "high". When sequence "3" commences the counter 60 and the pointer 86 are both essentially pointing at the same location or in other words have the same count therein. Counter 60 is maintained at this constant count which corresponds to the number of units or locations that are stored in the registers 78A and 78B. On the other hand the pointer 86 starts to count or rotate. For example, if there are four legitimate locations that are stored in the registers 78A and 78B then the counter and pointer both start at the same count of "4". The pointer 86 commences counting from that location up to a count of eight. The comparator 83 is comparing the output count from the counter 60 with that of the pointer 86. As long as the count from the pointer 86 exceeds the count from the counter 60 then the output on line 83A is at its low level which in turn means that there is a low level output coupled to the comparator 77. When the eight count is reached flip-flop 67 is set but this does not then control operation. Also, the flip-flop 84 is set and its output is coupled by way of gate 84A for resetting the pointer 86. When the pointer 86 goes to its "0" location then a high output is established on line 83A and as long as the count from pointer 86 is less than the count from counter 60, gate 77B is enabled as is the comparator 77. This circuitry is simply controlling the comparator 77 so that it looks at only legitimate data and does not look at locations in the shift registers 78A and 78B which contain no data and corresponds to units that are not operating.

During sequence "3" gate 65 is enabled and for a fixed period of time it can be assumed that the input on line 77A is constant. Because the shift registers 78A and 78B are being cycled the output from unit 66 cycles and in a particular location a positive output occurs from comparator 77 assuming that the signal from gate 77B is in its enabling state. Thus, gate 65 is also enabled on another input that couples from comparator 77. If the data in the latches 28A-28D is also a "1" then gate 65 is inhibited by way of gate 37A and flip-flop 79 is not set. Recirculation occurs by way of unit 80 and more particularly from the nine position of the registers 78A and 78B.

Thereafter, while the system is still in sequence "3" the data on line 77A changes as does the output from the latches 28A-28D. A comparison occurs for each of the running units to determine if it has been dropped.

If a unit has not been dropped the information in the registers 78A and 78B is essentially unaltered and all of the locations are recirculated. All of these locations are recirculated because it is the ninth position that is used and not the eighth position. When the eighth position is recirculated, as controlled from flip-flop 79, then one of the units is dropped. When the information in the registers 78A and 78B compare equally to the information in the latches 28A-28D then the system simply continues to sequence through this entire sequence "3". The pointer 86 continues to count and follows this information. The pointer 86 is shown as having eight counts but because of the division provided by flip-flop 84 the pointer 86 actually stays in synchronization with the registers 78A and 78B. Also, each of the clock pulses to the pointer 86 is also coupled by way of gate 84B to the latch 81. It is noted that gate 84B also receives a count "8" output from the pointer 86. Thus, at the eighth location the latch 81 is clocked. The information in latch 81 represents the longest running unit and information will be contained in this latch regardless of the number of units that are running.

When a unit has been dropped the corresponding "0" is stored in that location in the registers 24A and 24B then the gate 65 on the other hand is enabled and flip-flop 79 is set. For example, previous to dropping a unit there may have been three units running. If it is assumed that the second unit is being dropped then at that location as sensed by comparator 77 the recirculation through unit 80 changes so that the inputs 80A are recirculated. This has the effect of cancelling the second unit and substituting the third unit therefor which then actually becomes the new second unit. Thus, the registers 78A and 78B have information therein corresponding to the number of units that are operating. The units that are not operating are represented by, for example, all zeros in the other locations. If a unit is dropped there is not a "hole" in the register but instead the remaining units fill in so to speak. Thereafter, when another unit is added this unit enters the registers in the first position as the shortest running unit.

Under another condition wherein the system is meant to operate up to a maximum of eight units and wherein eight units are being operated, the system is conditioned to drop the longest running unit which is periodically stored during sequence "3" in the latch 81. The time-out signal from gate 53A has been discussed hereinbefore and when a time-out does occur under conditions hereinbefore described gate 36 senses this timing out and the longest running unit is dropped. It is noted that this time-out signal is coupled to gate 85 and when it occurs the pointer 86 is decremented. The time-out signal can only occur, however, when the comparator 77 is satisfied and occurs in sequence "1". In this sequence unit 66 transfers the longest running unit from latch 81 to the comparator 77 and thus it is this unit that is dropped by virtue of the action through gate 65 and the setting of flip-flop 79 in a manner as previously described. In the usual time-out sequence of operation during the next sequence "2" a new previously inhibited unit is picked up from the registers 78A and 78B. It is noted that the output from gate 53 causes a countdown of the counter 60 when the unit is dropped and similarly that a signal from line 42A to gate 60A causes an up count of the counter so that the counter 60 continuously maintains a cumulative count of the running units.

Tables I, II and III show typical situations as referred to above. Table I shows registers 78A and 78B with nine locations four of which are filled with data words. The other locations are non-data locations as sensed by gate 77B. In Table II location 3 unit has been dropped and the location 4 unit now becomes the location 3 unit. The number 4 location may be considered as the longest running in this example and Table III shows the remaining data words after the longest running unit has been dropped.

| | | | |
|---|---|---|---|
| 1 | 0 1 0 1 | 0 1 0 1 | 0 1 0 1 |
| 2 | 1 1 0 1 | 1 1 0 1 | 1 1 0 1 |
| 3 | 1 0 0 1 | 1 1 1 0 | 1 0 0 1 |
| 4 | 1 1 1 0 | 0 0 0 0 | 0 0 0 0 |
| 5 | 0 0 0 0 | 0 0 0 0 | 0 0 0 0 |
| 6 | 0 0 0 0 | 0 0 0 0 | 0 0 0 0 |
| 7 | 0 0 0 0 | 0 0 0 0 | 0 0 0 0 |
| 8 | 0 0 0 0 | 0 0 0 0 | 0 0 0 0 |
| 9 | 0 0 0 0 | 0 0 0 0 | 0 0 0 0 |
| | TABLE I | TABLE II | TABLE III |

Figure 2:
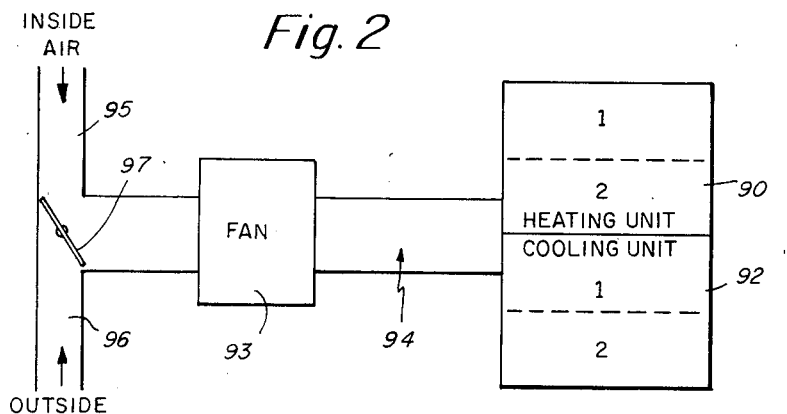
FIG. 2 is a schematic block diagram of a typcial heating, air-conditioning and ventilating unit which is controlled in accordance with the principles of this invention.

FIG. 2 shows a typical heating, air-conditioning and ventilating unit including separate dual units including heating unit 90 and cooling unit 92. A fan 93 is associated with these units as schematically depicted by the conducting duct 94. The fan connects to one duct 95 which couples air from the inside of the building through the fan. The fan also connects to another duct 96 which is for bringing outside air into the system. FIG. 2 schematically shows a damper 97. In the position shown in FIG. 2 this damper is blocking the outside air and permitting only a recirculation through the fan of the inside air by way of duct 95. The damper 97, however, may be rotated to at least one partially open position permitting some outside air to enter the system. In past systems this damper has simply been set at a minimum setting permitting a minimum amount of outside air to enter this system. However, in accordance with the present invention the damper 97 is controlled for selective operation, with the number of dampers in an entire system that are opened being dependent upon the running total count in the building.

Figure 3:
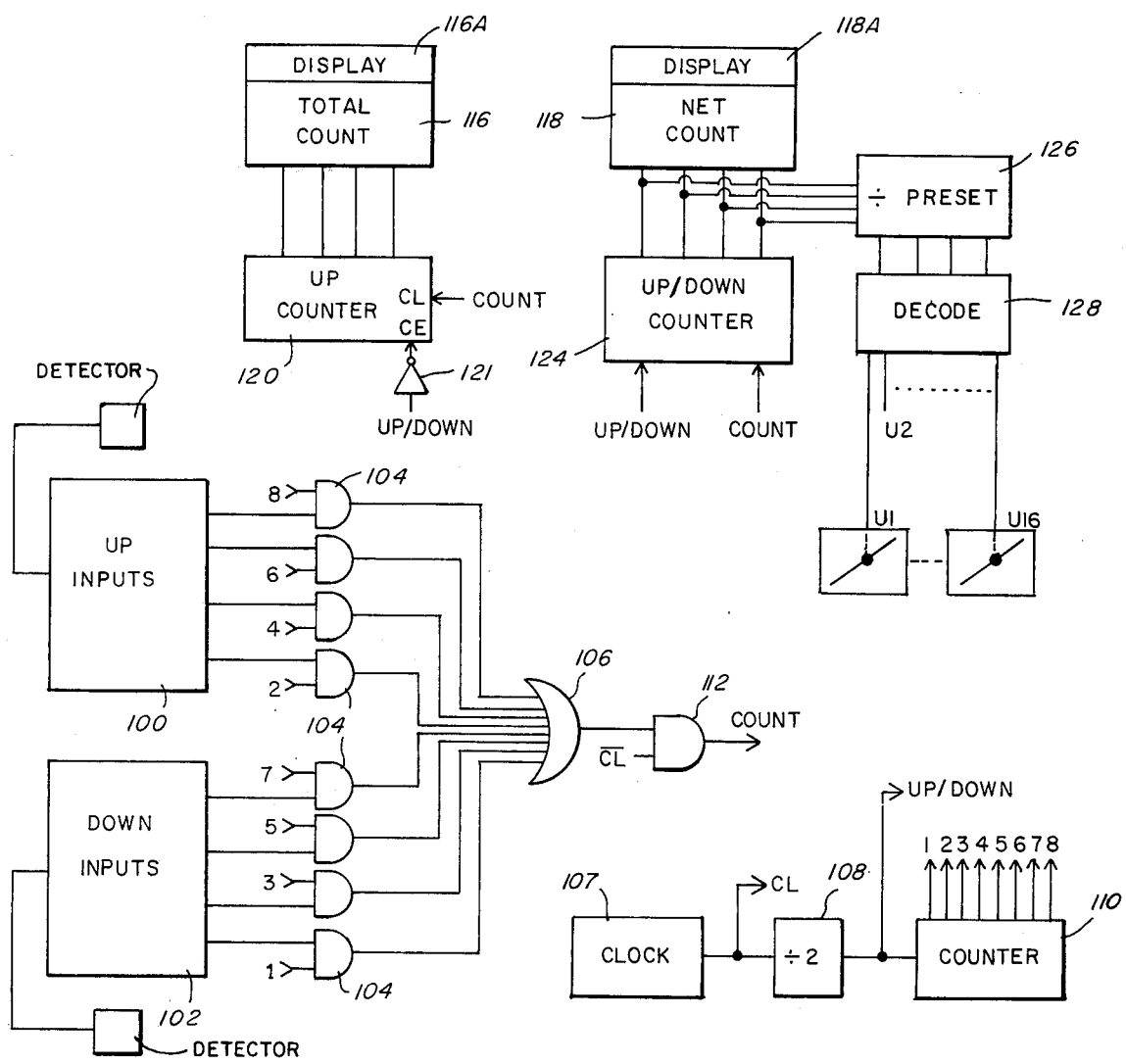
FIG. 3 is a block diagram of a control system also in accordance with this invention which in a preferred form controls the dampers of heating, air-conditioning and ventilating units as a function of cumulative count of persons in a building.

FIG. 3 shows one system for practicing the present invention by accumulating a total count of occupants in a building and using that count to control the operation of the ventilating units to admit outside air in a volume which is a function of the count. FIG. 3 shows box 100 for accumulating "up inputs" and box 102 for accumulating "down inputs". For the sake of simplicity it can be assumed that the building has one or more doorways that permit entrance of people and a different door or set of doors for permitting the people to leave the building. An optical detector may be used for sensing the passage of a person. Such detectors are well known. The output from the detector couples to either box 100 or box 102. Each of these boxes may comprise one or more bi-stable devices. In the embodiment shown in FIG. 3 where there are four output lines there are then also four bi-stable devices corresponding to four separate entranceways or exit ways. Essentially, any one of the output lines from either of the boxes can be at its enabling or "high" level when there has been a detection associated with that entranceway or exit way. The inputs of boxes 100 and 102 are scanned by means of a gating arrangement including eight AND gates 104 and an OR gate 106. A relatively high speed clock 107 is provided. The output from clock 107 couples to a divider 108 and the output from the divider couples to an eight position counter 110. The output from the counter is shown as having counts 1-8. These outputs couple in the order shown to the AND gates 104. Thus, the AND gates 104 are interrogated in sequence with first a down input being interrogated followed by an up input, etc. The level of the output from the divider 108 which is shown as the up/down signal controls certain of the other circuitry shown in FIG. 3 and keeps track of whether a count pulse from gate 112 is an up count or a down count. OR gate 106 passes along pulses from gates 104. The output from gate 106 couples to AND gate 112 whose output is a count pulse.

FIG. 3 also shows a total count box 116 and a net count box 118 both of which may comprise registers or latch circuits which may be controlled from the clock even though no clock signals are shown as being coupled thereto. The total count box 116 has a display 116a associated therewith and similarly the net count box 118 has a display 118a associated therewith. The display 116a is a display of a total running count of all people entering the building throughout a prescribed period of time such as a day. This count does not include a negative count for those persons who have left the building during the day. The display 118 gives a total count at all times of those persons in the building.

FIG. 3 shows an up counter 120 which may be a conventional binary counter having a clock input and also a clock enable input. The output from the gate 112 couples to the clock input to count this counter 120. However, the counter is only enabled when up inputs are being interrogated. The up/down signal from divider 108 couples by way of inverter 121 to the clock enable input of this counter 120 and permits counting only during the up sequence.

FIG. 3 shows another counter which is an up/down counter 124. This counter is also of conventional design and has two basic inputs which include a count input and an input that controls whether the counter counts up or counts down. The up/down signal is coupled to this input of the counter and the output from gate 112 is connected to the count input of counter 124. Thus, counter 124 maintains a total running count adding people as they enter the building and subtracting those people who leave the building. This count is coupled to the net count box 118 and is displayed by display 118a.

The total count from counter 124 is also coupled to a divider 126. Although four lines are shown from the counter 124 there may be a greater number of output lines as it may be desirable to count in a binary fashion or a binary coded decimal fashion up to 500 or more. One may determine beforehand that, for example, for every 50 occupants in the building one of the dampers has to be set to its minimum (amount of inside air) position for providing ventilation. The divider 126 provides this divide by 50 or any other appropriate divide count. Thus, divider 126 may at any one time contain a count corresponding to the number of units that is desired to be ventilated. The output from the divider 126 couples to a conventional decode circuit 128 and the output from the decoder couples to the units U1–U16. FIG. 3 shows two of the units U1 and U16 with the control coupling schematically to the dampers of each unit. For example, the count from the divider 126 may be a count of "5" and the decoder may be constructed so that it simply selects the first five units U1–U5 for operation of their dampers to provide the necessary ventilation. Alternatively, the output from the divider 126 may control the decoder in a different mode of operation so that every other unit is operated with a maximum of five being operated.

Having described a limited number of embodiments of this invention it should now be apparent that numerous modifications can be made in these embodiments all of which are contemplated as falling within the scope of the invention and solely limited by the appended claims. For example other circuit designs can be used for practicing the demand concepts of this invention. The occupants can be counted also to control other devices than heating, air conditioning and ventilating units.

What is claimed is:

1. A method of controlling the operation of a plurality of controllable devices that are each thermostatically controlled and include means for initiating a demand and means for operating each device, said method comprising;
   storing an indication of each device that is demanding,
   operating only a predetermined number of devices less than the plurality of demanding devices, storing an indication of each device that has demanded but is inhibited from operation, sensing an operating device being satisfied and terminating operation of the device, and terminating operation of the longest running device when a unit indicated as being inhibited has been in the inhibited state a preselected period of time.

2. A method as set forth in claim 1 and preventing termination of operation of the longest running device when another operating device has been satisfied during the preselected period of time.

3. A method as set forth in claim 1 and permitting operation of an inhibited device after another device has been satisfied.

4. A method as set forth in claim 3 wherein the longest waiting inhibited device is permitted operation.

5. A system for controlling the ventilation section of a heating, air-conditioning and ventilating system to regulate outside air admitted to the building, said control system comprising;

means for registering a running count of the number of persons in the building at a time, means responsive to said running count for establishing a damper control count proportional to said running count, said ventilating section including a controllable damper means for enabling outside air admittance having at least two positions, and means responsive to the magnitude of said damper control count for controlling said damper means between positions as a function of count to admit more air as the running count increases, said damper means being established at a first position at a first predetermined running count and at a second position at a second larger magnitude predetermined count.

6. A system as set forth in claim 5 including a plurality of heating, air-conditioning and ventilating units each having a damper means.

7. A system as set forth in claim 6 wherein said means for registering includes detector means for detecting the entry of persons to the building and the exit of persons from the building through passageway means of the building.

8. A system as set forth in claim 7 including bi-directional counting means responsive to said detector means to count up when people enter the building and subtract the count when people leave the building to thereby provide a running total count of persons actually in the building at any and all times.

9. A system as set forth in claim 8 including divider means coupled from the counting means to provide a unit count directly related to the people count and representative of the total number of damper means that are to be controlled.

10. A system as set forth in claim 6 including means responsive to the people count to operate a damper means for each predetermined number of counts.

11. A system as set forth in claim 7 wherein the detector means are disposed at the passageway into or out of the building.

12. A system as set forth in claim 5 wherein one of the positions of said damper means is a substantially closed position and the other position is a partially open position.

13. A system as set forth in claim 6 wherein one of the positions of each said damper means is substantially closed and the other is partially open so that as the count increases more of the damper means are controlled to open and admit more air.

14. A method for controlling a ventilating means including a damper means for enabling outside air admittance having at least two positions and disposed in a building, said method comprising the steps of registering a running count of the number of persons in the building at a time, establishing from said running count a damper control count proportional to said running count, and controlling, in accordance with said damper control count, said damper means between positions as a function of count to admit more ventilating air as the people count increases, whereby said damper means is controlled to a first position at a first predetermined count and to a second position at a second predetermined count.

15. A method as set forth in claim 14 including enabling a number of damper means wherein the total number enabled correlates to the people count so that as the people count increase so also do the number of enabled damper means.

* * * * *